United States Patent Office.

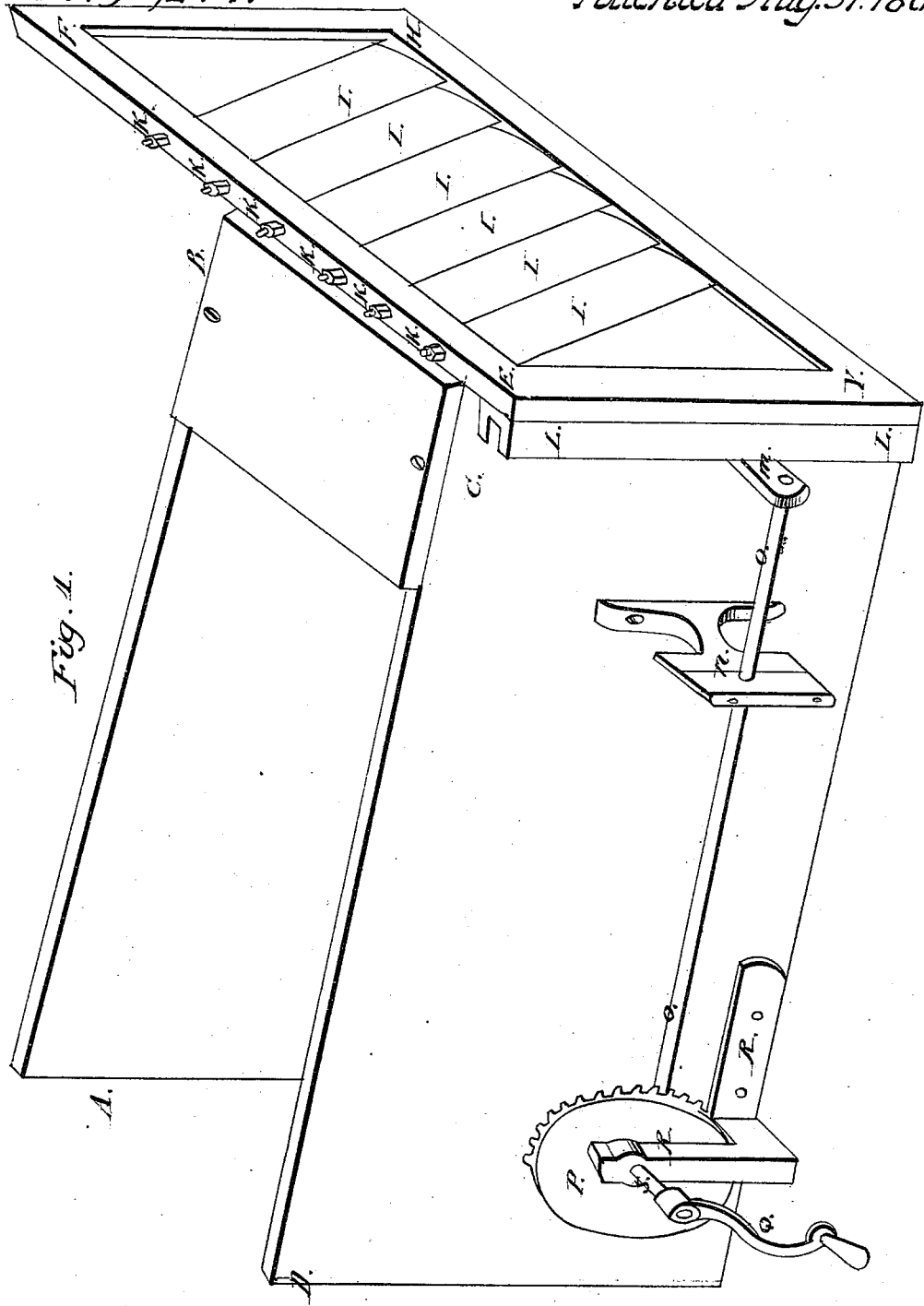

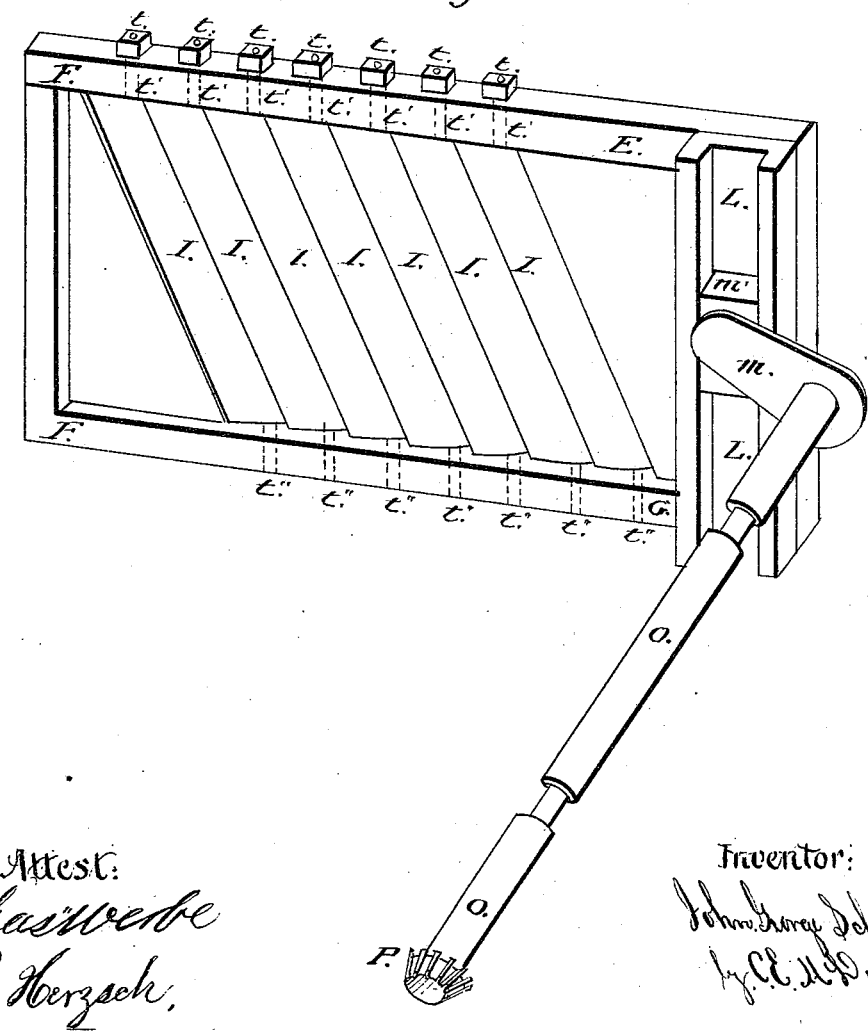

JOHN GEORG SCHWARZ, OF INDIANAPOLIS, INDIANA, ASSIGNOR TO HIMSELF AND JOHN GEORGE BRAND.

Letters Patent No. 94,244, dated August 31, 1869.

IMPROVEMENT IN CROUT-CUTTER.

The Schedule referred to in these Letters Patent and making part of the same.

*To all whom it may concern:*

Be it known that I, JOHN GEORG SCHWARZ, of Indianapolis, in the county of Marion, and in the State of Indiana, have invented an Improved Crout-Cutter; and I do hereby declare that the following is a full, clear, and exact description thereof, reference being had to the accompanying drawings, and to the letters of reference marked thereon.

The nature of the invention consists in the use of a sliding gate filled with knives, for the purpose of cutting crout, and in the device used to produce the proper motion in the said gate, said device to be made of wood, iron, and steel, or any other convenient and suitable materials.

To enable others skilled in the art to make and use my said invention, I proceed to describe it more fully, as follows:

A B C D is a wooden box, of the shape there represented.

E F G H, the sliding gate, which runs in convenient gibs, as represented in section by E' and G of Figure 3 of said drawings.

L L, the eccentric slide, by means of which it is propelled by the crank M.

O O, a shaft turned by means of bevel-gear at P, which is driven by the winch Q.

R R and N are boxing, upon which the machinery of the device runs, and K K are nuts for adjusting the knives I I I, &c., which turn for that purpose upon the pivots $t'$ $t'$ and $t''$ $t''$, as represented in Figure 2 of the specification.

To use my said invention, the box A B C D is made fast to a table or bench by convenient clamps, in such a way that the winch Q will be free to turn, and the gate E F G H, free to slide.

The operator then turns the winch Q with the right hand, and feeds the cabbage into the box A B C D against the knives in gate E F G H with the left hand. The reciprocating motion of the gate will constantly bring the edges of the knives into contact with the cabbage, and so cut it off in suitable pieces for making crout.

What I claim, and desire to secure by Letters Patent, is—

1. The sliding gate E F G H, when constructed with the knives I I and the nuts K K, substantially as set forth.

2. The combination and arrangement of gearing P, shaft O, crank M, cross-head $m'$, slide L, and knife-gate E F G H, substantially as described.

3. The whole device, considered as a whole, when constructed and operated substantially as set forth.

In testimony that I claim the foregoing specification, I have hereunto set my hand, this 12th day of October, 1868.

JOH. G. SCHWARZ.

Witnesses:
CHAS. WERBE,
R. C. JOSEPH.